United States Patent
Lee et al.

(10) Patent No.: US 7,787,186 B2
(45) Date of Patent: Aug. 31, 2010

(54) LIGHT CONVERGING OPTICAL SHEET

(75) Inventors: Chen-Sheng Lee, Taoyuan County (TW); Wen-Feng Cheng, Taoyuan County (TW)

(73) Assignee: Entire Technology Co., Ltd., Taoyuan County (TW)

( * ) Notice: Subject to any disclaimer, the term of this patent is extended or adjusted under 35 U.S.C. 154(b) by 390 days.

(21) Appl. No.: 11/850,069

(22) Filed: Sep. 5, 2007

(65) Prior Publication Data

US 2009/0061174 A1    Mar. 5, 2009

(51) Int. Cl.
    *G02B 27/08*    (2006.01)
(52) U.S. Cl. ...................................... 359/619; 359/457
(58) Field of Classification Search .............. 359/619, 359/457, 298, 618, 621, 631
    See application file for complete search history.

(56) References Cited

U.S. PATENT DOCUMENTS

2005/0053747 A1 *    3/2005    Yang et al. ................ 428/40.1

* cited by examiner

*Primary Examiner*—Jordan M. Schwartz
*Assistant Examiner*—James C Jones
(74) *Attorney, Agent, or Firm*—Alan Kamrath; Kamrath & Associates PA

(57) ABSTRACT

An optical sheet with better brightness-enhancing effectiveness includes a substrate and pluralities of microstructures disposed on the substrate. The microstructures are spaced from one another at a distance d. The cross-section of the microstructure is formed in a triangle which has a base length D. Distance d and base length D satisfy the following equation: $0 < d/(d+D) \leq 0.61$.

16 Claims, 10 Drawing Sheets

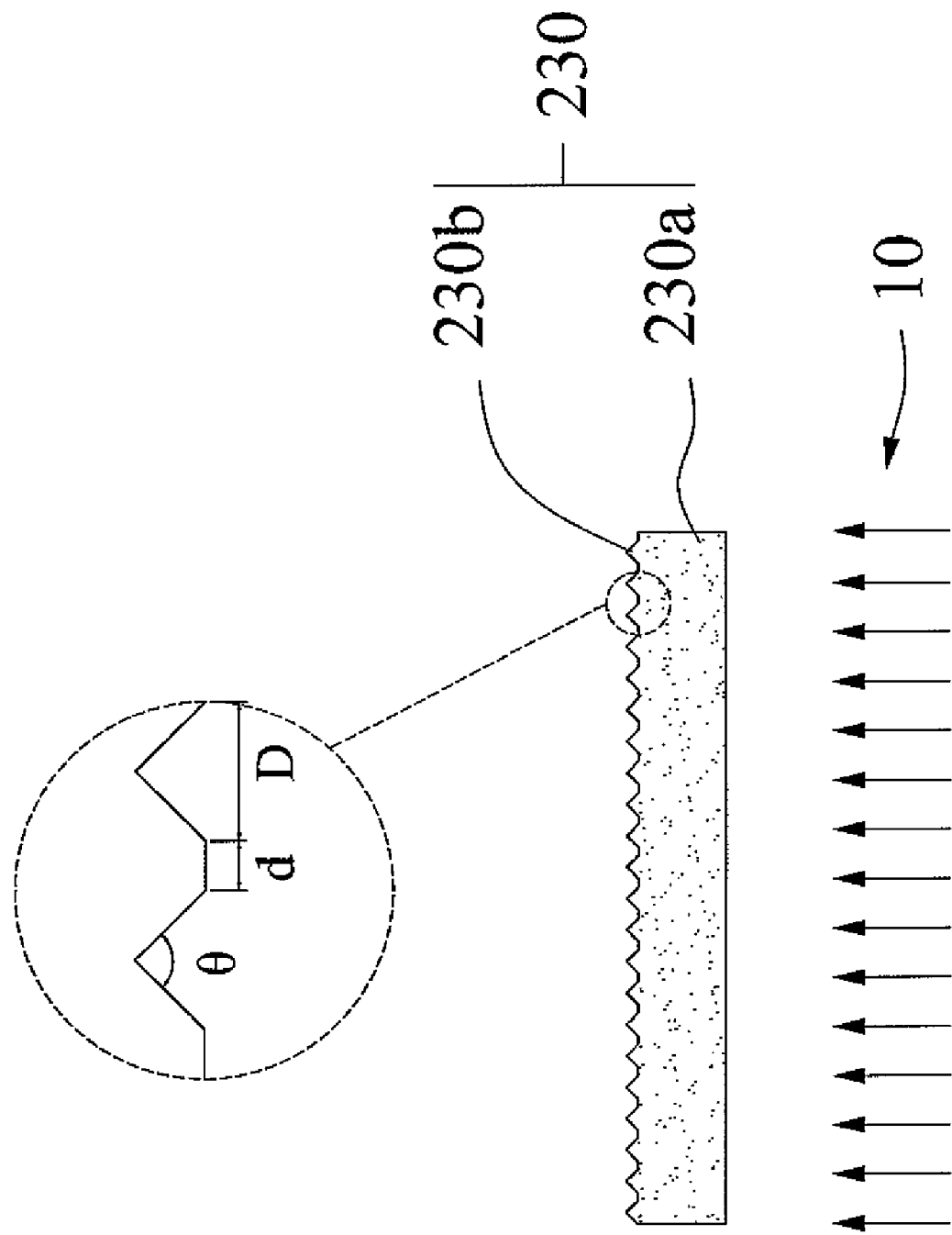

LIGHT CONVERGING OPTICAL SHEET

BACKGROUND OF THE INVENTION

1. Field of the Invention

The present invention relates to an optical sheet and, particularly, to a brightness enhancing optical sheet.

2. Description of the Prior Art

In recent years, the traditional cathode ray tube display (commonly called CRT display) is being gradually replaced by a liquid crystal display (LCD). This is mainly because the LCD releases far less radiation than the CRT display, and the production cost of the LCD also dropped significantly in recent years. In general, the LCD consists of two main elements, namely a backlight module and a liquid crystal panel. The backlight module mainly aims to provide light to the LCD.

Refer to FIG. 1 for a conventional backlight module. The backlight module 100 mainly includes a cold cathode fluorescent lamp (CCFL) 110, a reflection box 120, a diffusion plate 130 and a plurality of optical films 140. The CCFL 110 aims to generate light. The reflection box 120 aims to direct the light generated by the CCFL 110 towards the diffusion plate 130. The optical films 140 includes a diffusion film 142 and a brightness-enhancement film (BEF) 144. The diffusion plate 130 aims to diffuse the light generated by the CCFL 110 and project the light to a liquid crystal panel (not shown in the drawings) to make the light more uniform to prevent uneven brightness on the LCD. The diffusion plate 130 contains a plurality of light diffusion particles which lower the transmittance of the diffusion plate 130. In general, the transmittance of the diffusion plate 130 is between 50%-70%.

However, the diffusion plate 130 often cannot fully overcome the problem of uneven brightness. Hence, a diffusion film 142 has to be added to diffuse the light more evenly. Moreover, as the light emission angle of the light emitted from the diffusion film 142 is larger, the BEF 144 has to be added on an upper side of the diffusion film 142. The BEF 144 has a thickness about 0.062 mm to 0.375 mm. The BEF 144 mainly includes a substrate 144a and a plurality of microstructures 144b disposed on the substrate 144a. The microstructures 144b are prism structures in a triangular shape, and each has a cross section in the form of an isosceles right triangle in the vertical direction. The BEF 144 provides a light converging effect and, thus, can enhance the brightness within the visual angle range of the backlight module 100.

Because of manufacturing process and material, the BEF 144 is the most expensive in the cost of the backlight module 100. Referring to FIG. 2, in order to reduce cost, a technique has been developed that forms a plurality of microstructures 130b' on the diffusion plate 130'. The microstructures 130b' are triangular struts to provide a light converging effect. Hence the diffusion plate 130' can replace the BEF 144 and reduce the production cost of the backlight module 100'. However, the light converging effect provided by the diffusion plate 130' still is not as desirable as the BEF 144. Hence, how to improve the light converging effect of the diffusion plate is an issue remaining to be resolved in the industry.

SUMMARY OF THE INVENTION

It is an object of the present invention to provide an optical sheet with an improved light converging effect.

The optical sheet according to the invention includes a substrate and a plurality of microstructures disposed on the substrate. The microstructures are spaced from one another at a distance d, are formed in triangular struts, and have respectively a vertex angle of 90°. Namely the cross section of each of the microstructures is an isosceles right triangle with a base length D. Distance d and D are formed to satisfy the following equation:

$$0 < d/(d+D) < 0.61$$

In another aspect, the optical sheet is formed with the distance d and base length D to satisfy the following equation:

$$0.03 \leq d/(d+D) < 0.52$$

In yet another aspect, the optical sheet is formed with the distance d and D to satisfy the following equation:

$$0.06 \leq d/(d+D) < 0.38$$

In yet another aspect, the optical sheet is formed with the distance d and D to satisfy the following equation:

$$0.08 \leq d/(d+D) < 0.27$$

In yet another aspect, the optical sheet is formed with the distance d and base length D to satisfy the following equation:

$$d/(d+D) = 0.13$$

In yet another aspect, the optical sheet is formed with the distance d and base length D to satisfy the following equation:

$$d/(d+D) = 0.1$$

In yet another aspect, the optical sheet is formed at a thickness between 0.5 mm and 2 mm or between 0.062 mm and 0.375 mm.

In yet another aspect, the optical sheet is made from material selected from the group consisting of polymethylmethacrylate, polycarbonate, polystyrene, methyl methacrylate-styrene monomers copolymer, polyvinyl, polypropylene and polyethylene terephthalate.

It is found that the optical sheet of the invention has a more desirable light converging effect in a condition in which the microstructures are spaced from one another at a selected distance and $021 \, d/(d+D) < 0.61$. The light converging effect is optimum in the condition of $d/(d+D) = 0.13$.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 3 is a schematic view of an embodiment of the optical sheet of the invention.

DESCRIPTION OF THE PREFERRED EMBODIMENTS

Figure 1:
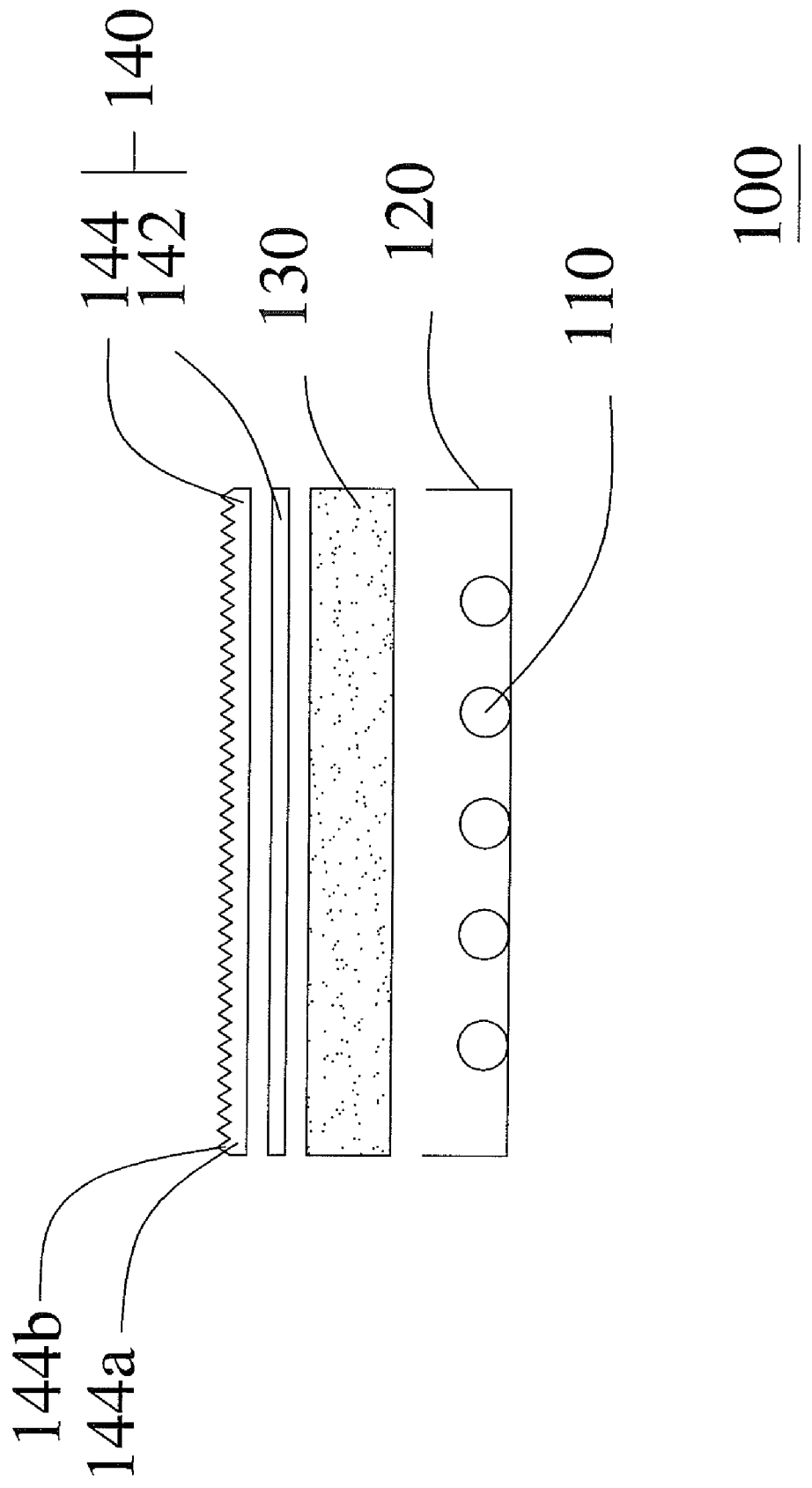
FIG. 1 is a schematic view of a conventional backlight module.
Figure 2:
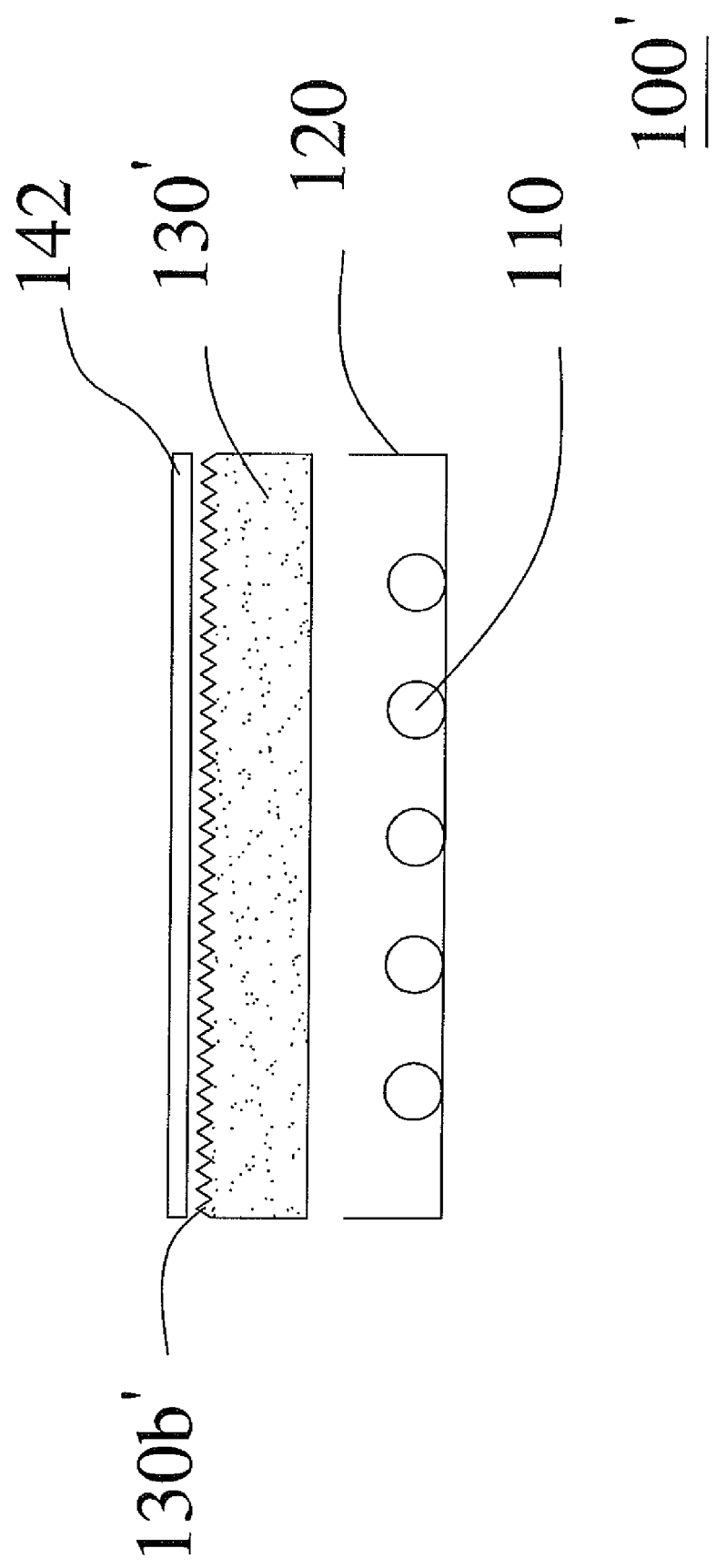
FIG. 2 is a fragmentary enlarged view of a brightness-enhancing film.

Refer to FIG. 3 for an embodiment of the optical sheet of the invention. The optical sheet 230 includes a substrate 230a and a plurality of microstructures 230b disposed on the substrate 230a. The microstructures 230b are spaced from one another at a selected distance d. Each microstructure 230b is formed in a triangular strut with a cross section of an isosceles right triangle having a vertex angle θ at 90°. The triangle has two equal lateral sides and a base length D.

Simulations for light converging effect are performed on the optical sheet 230. In the simulations, incident light 10 is a uniform parallel light with an intensity of 1000 lumen. The substrate 230a has a length and width of 4.8 mm and a thickness of 0.6 mm. The optical sheet 230 is made from a transparent material selected from the group consisting of polymethylmethacrylate, polycarbonate, polystyrene, methyl methacrylate-styrene monomers copolymer, polyvinyl, polypropylene and polyethylene terephthalate. In this embodiment, the transparent material selected is polymethylmethacrylate. During the simulations, the sum of the base length D and the distance d is maintained a constant, namely 0.3 mm. The distance d is changed relative to the ratio of (D+d) to perform the simulations.

Figure 4A:
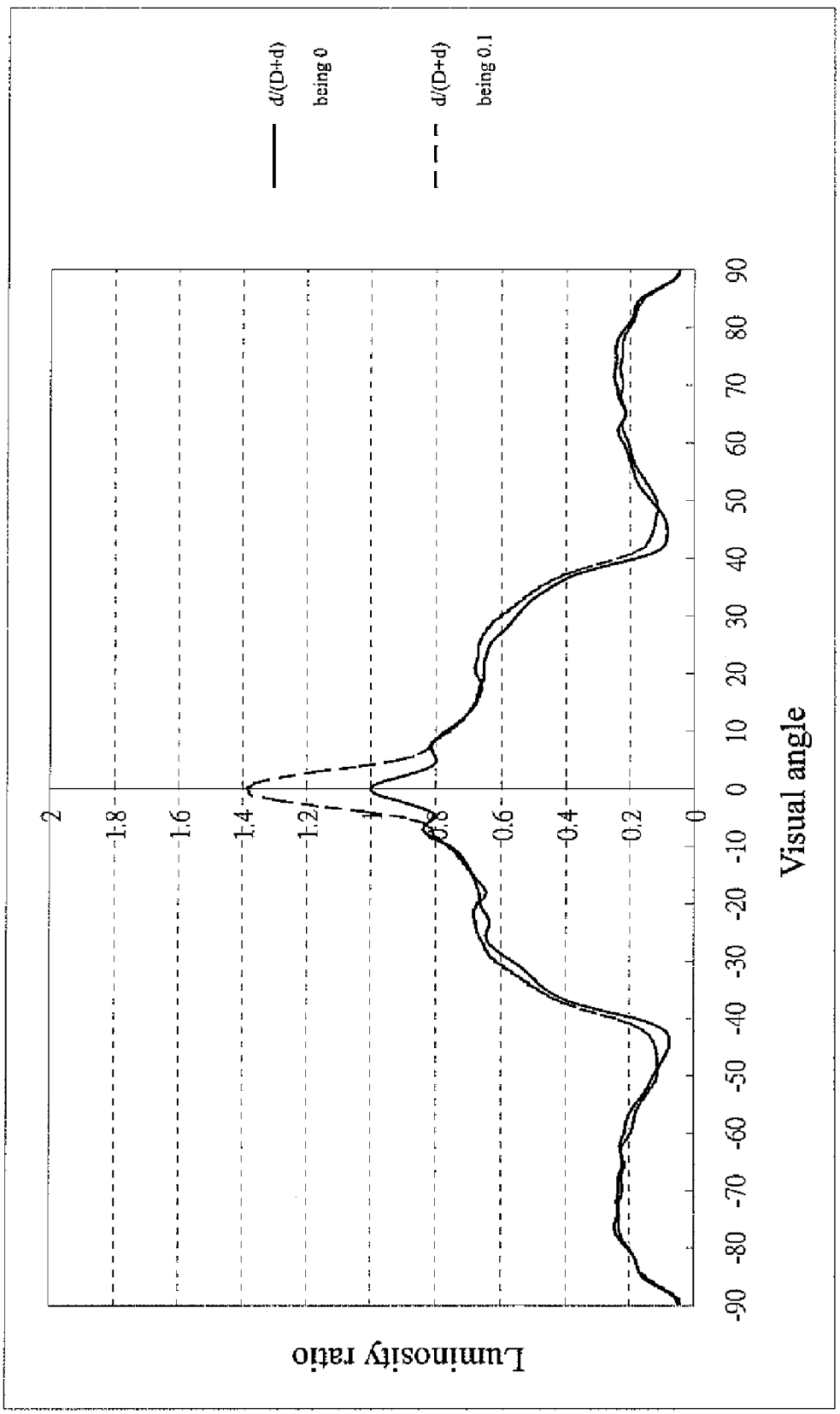
FIGS. 4A, 4B and 4C are charts showing the relationship of luminosity distribution and visual angle on the light emission surface of the optical sheet in the conditions of d/(D+d) being 0.0.1, 0.3 and 0.5.
Figure 4B:
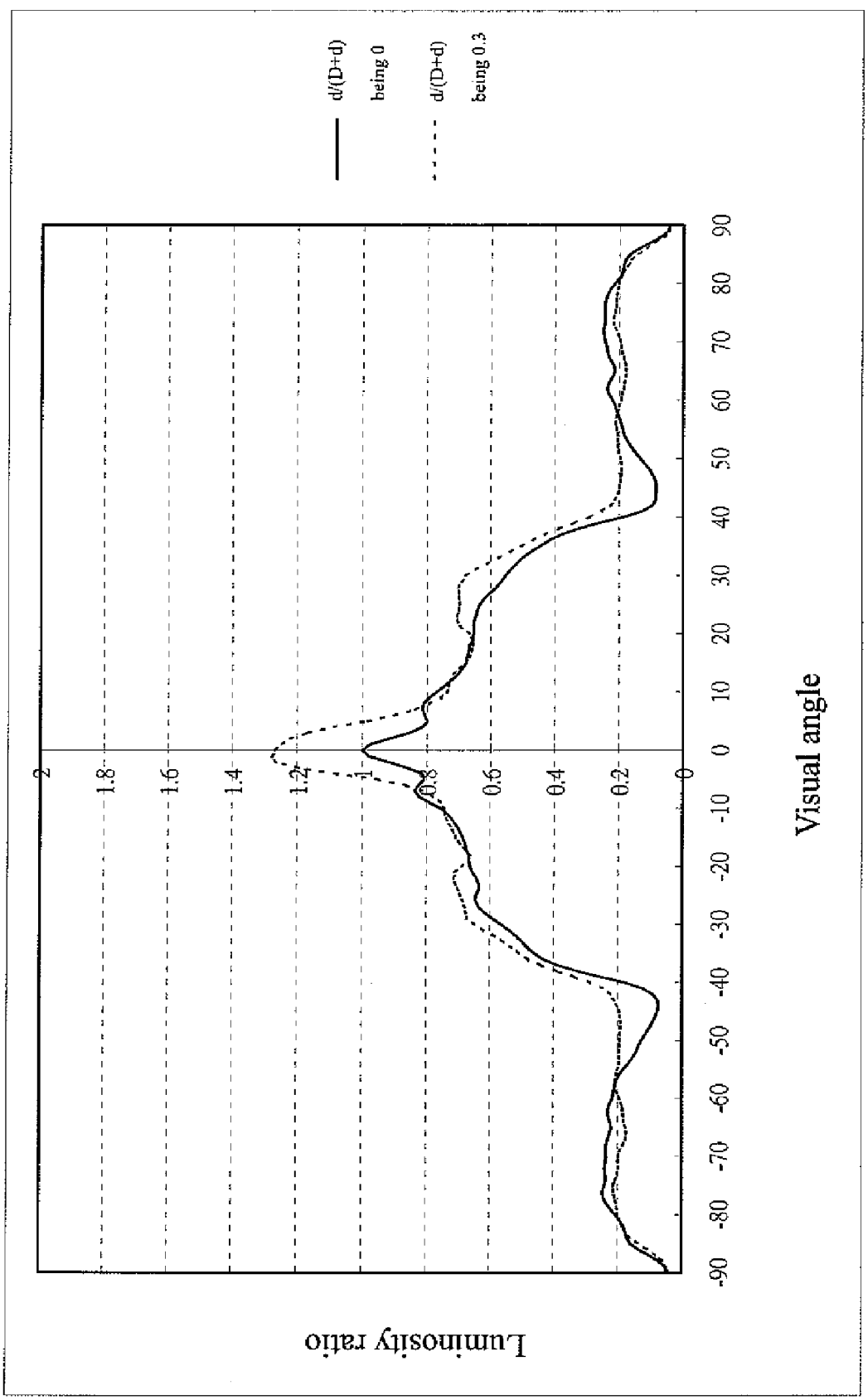
Figure 4C:
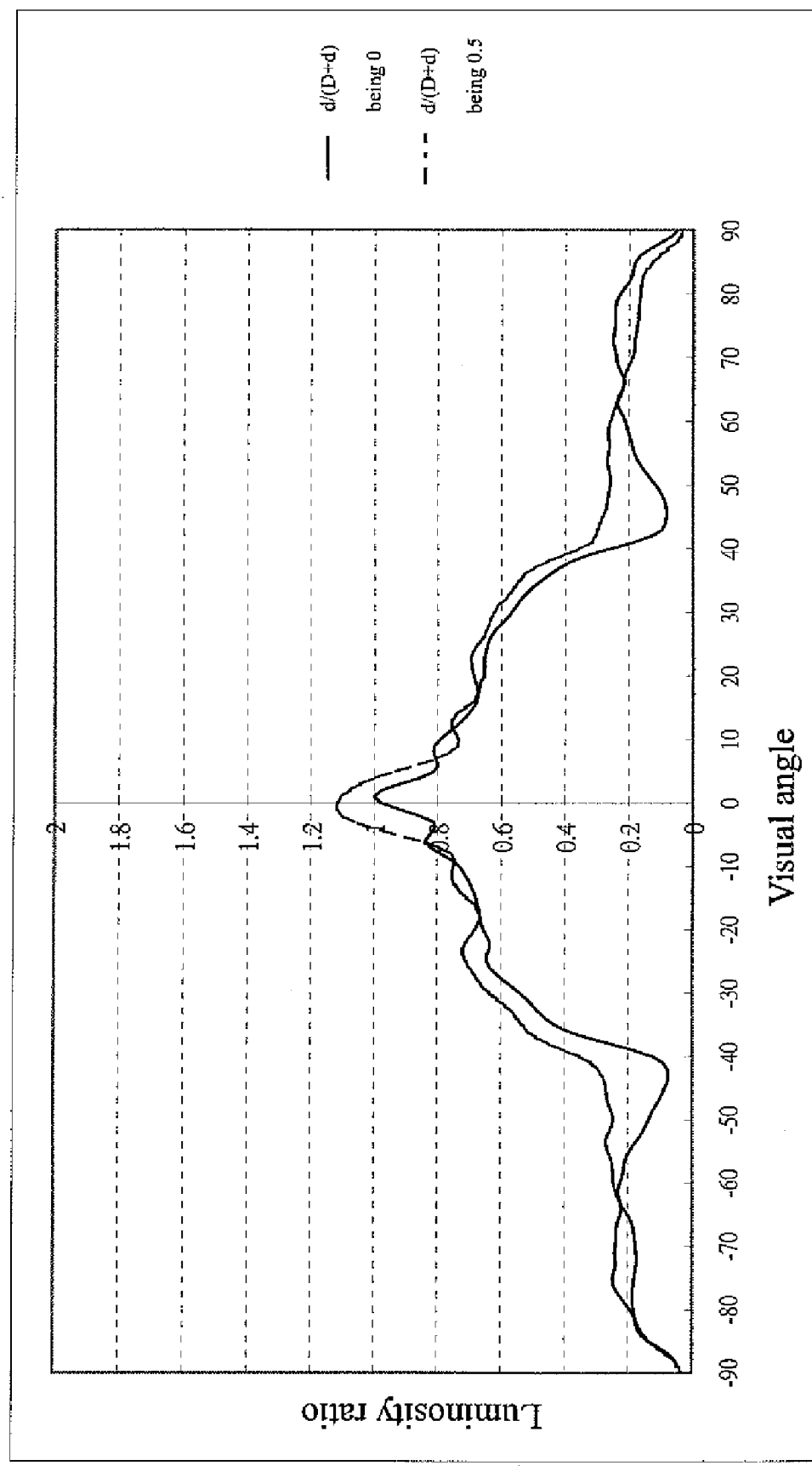

Refer to FIGS. 4A, 4B and 4C for charts which show the relationship of luminosity distribution and visual angle on the light emission surface of the optical sheet 230 in the conditions of d/(D+d) being 0, 0.1, 0.3 and 0.5. The horizontal coordinate represents the range of visual angle (−90°-90°), and the vertical coordinate represents the ratio of luminosity, namely the ratio against the brightness of the optical sheet 230 at a visual angle of 0° with no interval among the microstructures (such as the conventional diffusion plate 130' with d/(D+d) being 0). FIGS. 4A, 4B and C show that when the ratio of the distance d vs. (D+d) is 0.1, 0.3 and 0.5 for the microstructures 230b, the brightness of the optical sheet 230 increases by 38%, 27% and 12% compared with the conventional diffusion plate 130' on the light emission surface at the visual angle of 0°.

Figure 5:
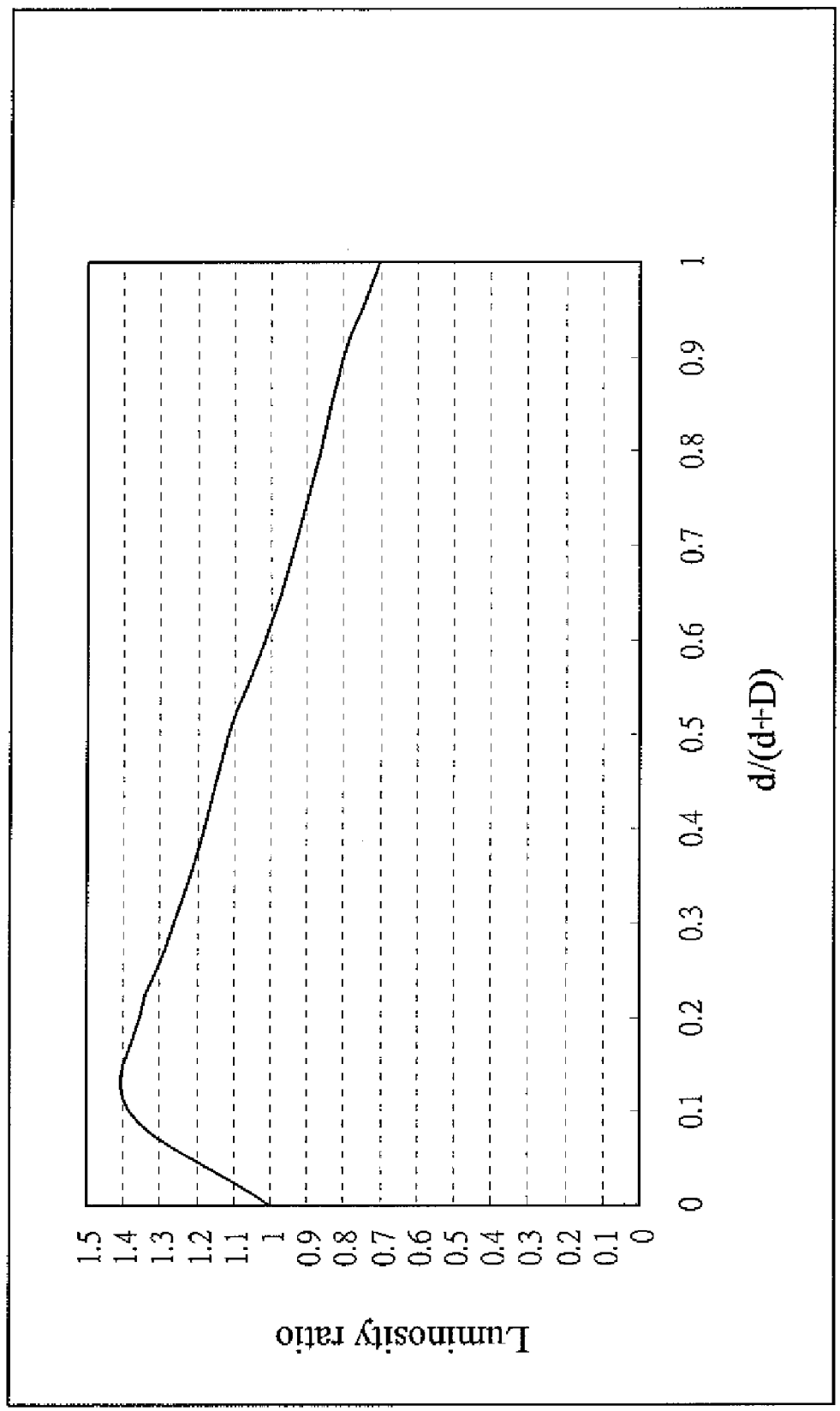
FIG. 5 is a chart showing the relationship of the ratio of d/(D+d) and the luminosity on the light emission surface of the optical sheet with the visual angle being 0°.

Refer to FIG. 5 for the relationship of the ratio of d/(D+d) and the luminosity on the light emission surface of the optical sheet when the visual angle is 0°. The horizontal coordinate represents the ratio of d/(D+d), and the vertical coordinate represents the ratio of luminosity on the light emission surface of the optical sheet against the conventional diffusion plate 130' (namely with d/(D+d) being 0). As shown in FIG. 5, when d/(D+d) is about 0.13, the optical sheet 230 has an optimum light converging effect. After the ratio of d/(D+d) is over 0.13, the light converging effect of the optical sheet 230 starts diminishing. When the ratio of d/(D+d) is over 0.61, the light converging effect of the optical sheet 230 is smaller than the conventional diffusion plate 130'.

FIG. 5 also indicates that when d/(D+d) is between 0.03 and 0.52, compared with the conventional diffusion plate 130', the luminosity (with the visual angle of 0° on the light emission surface of the optical sheet 230 is higher by at least 10%. When d/(D+d) is between 0.06 and 0.38, compared with the conventional diffusion plate 130', the luminosity (with the visual angle 0°) on the light emission surface of the optical sheet 230 is higher by at least 20%. When d/(D+d) is between 0.08 and 0.27, compared with the conventional diffusion plate 130', the luminosity (with the visual angle of 0°) on the light emission surface of the optical sheet 230 is higher by at least 30%. When d/(D+d) is 0.13, compared with the conventional diffusion plate 130', the luminosity (with the visual angle of 0°) on the light emission surface of the optical sheet 230 is higher by at least 40%.

Figure 6:
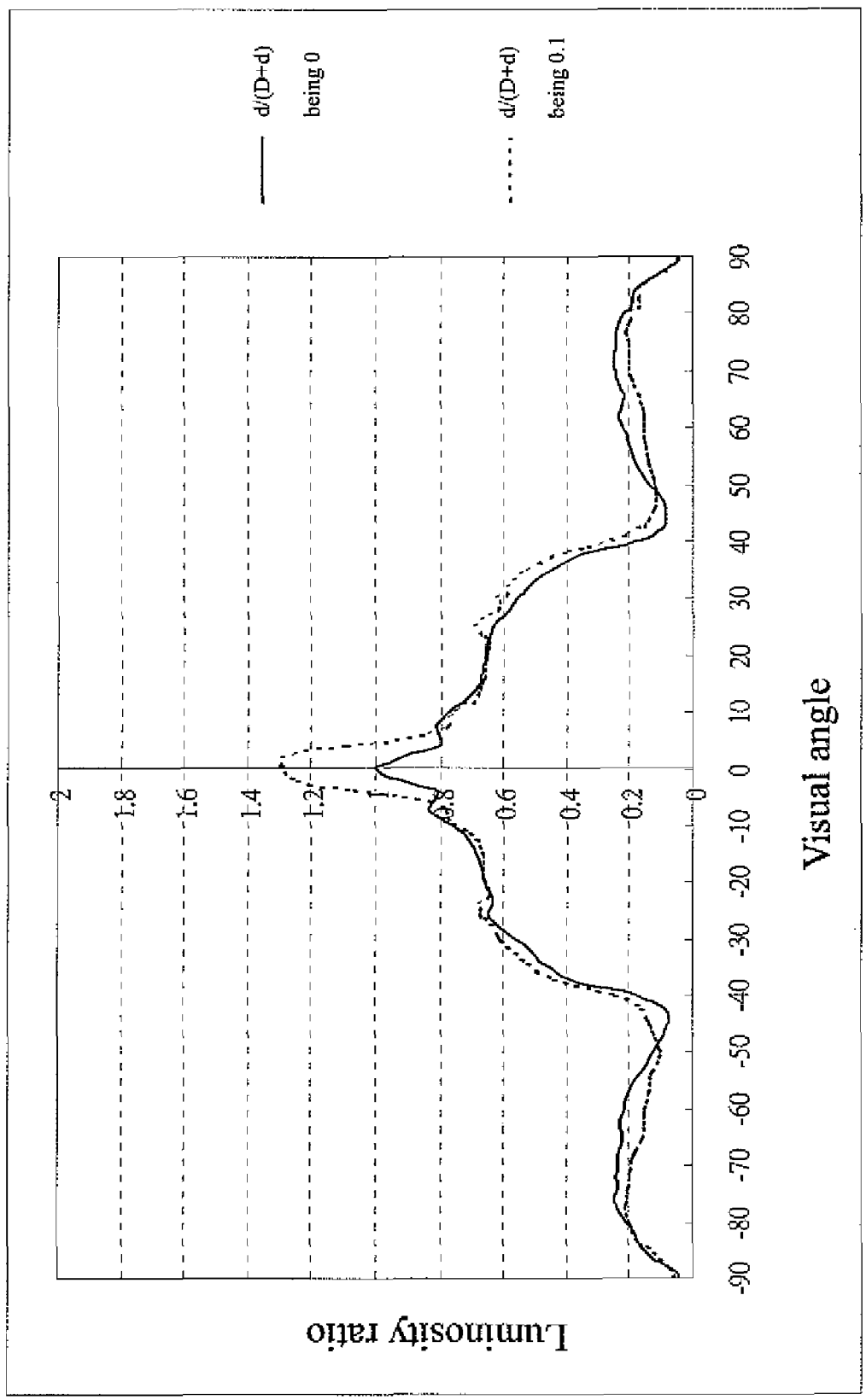
FIG. 6 is a chart showing luminosity distribution on the light emission surface of the optical sheet which has a thickness of 1.376 mm with d/(D+d) being 0.1.

In the simulations previously discussed, the thickness of the substrate 230a is 0.6 mm. Even if the thickness of the substrate is 1.376 mm, when the ratio of d/(D+d) is 0.1, and compared with the conventional technique (namely d/(D+d) being 0), the luminosity on the light emission surface of the optical sheet 230 is still higher by 30% (referring to FIG. 6). It indicates that the light converging effect of the optical sheet 230 is mainly determined by the ratio of d/(D+d).

As a conclusion, when 0<d/(d+D)<0.61, compared with the conventional diffusion plate 130', the optical sheet 230 has a more desirable light converging effect. When d/(D+d) is 0.13, the optical sheet 230 has an optimum light converging effect. Moreover, the simulation outcomes indicate that even if the thickness of the substrate 230a decreases to 0.06 mm and when the ratio of d/(D+d) is 0.1, the luminosity on the light emission surface of the optical sheet 230 is still higher by about 40% than the conventional technique. Using the optical sheet 230 at the thickness of 0.06 mm to replace the BEF 144 in FIG. 1 can achieve more a desirable light converging effect.

In short, the invention not only improves the light converging effect of the conventional diffusion plate 130 (with the thickness ranged from 0.5 mm to 2 mm), but also, can improve the light converging effect of the BEF 144 (with the thickness ranged from 0.062 mm to 0.375 mm).

Figure 7:
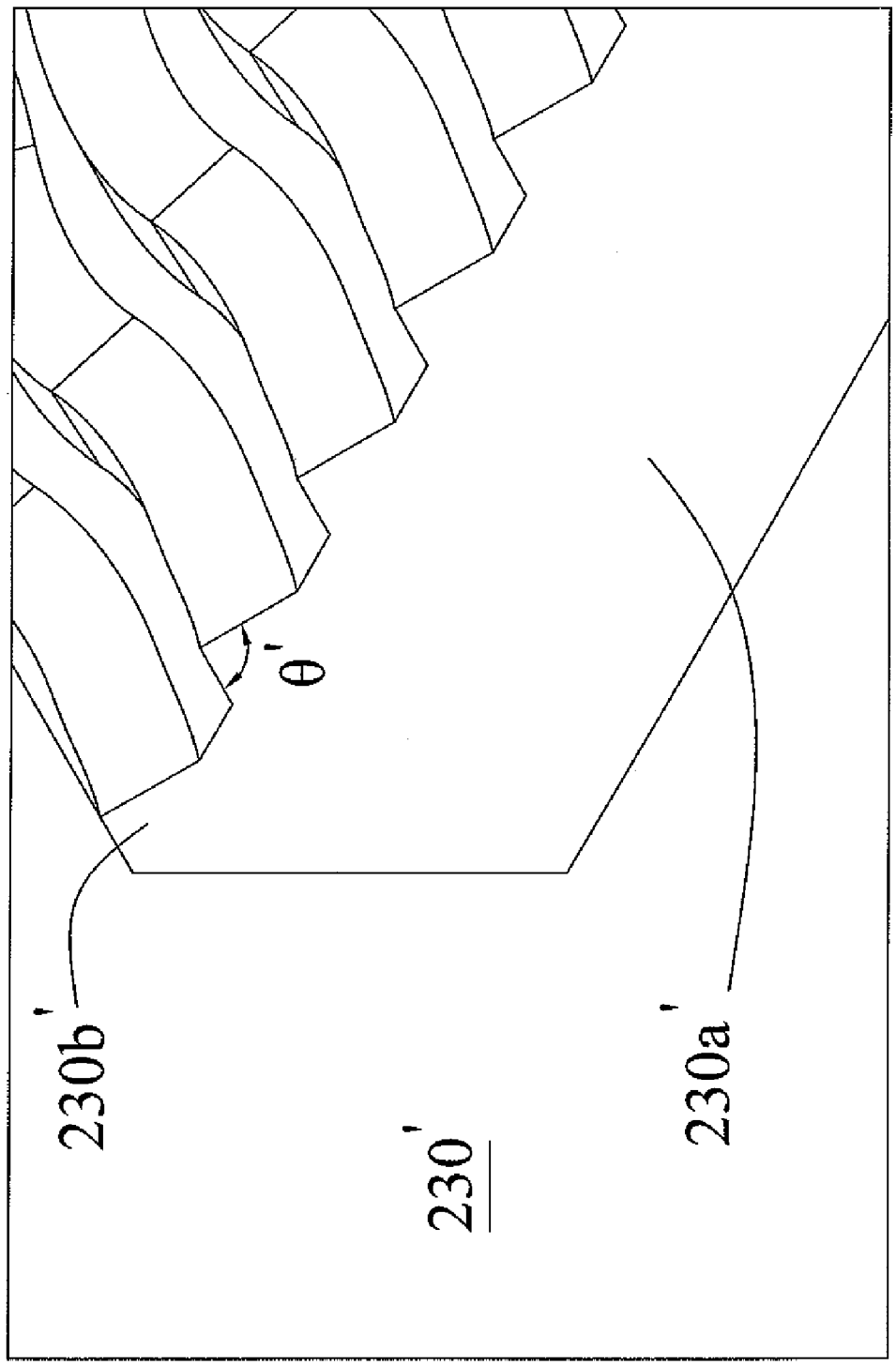
FIG. 7 is a fragmentary perspective view of another embodiment of the optical sheet of the invention.
Figure 8:
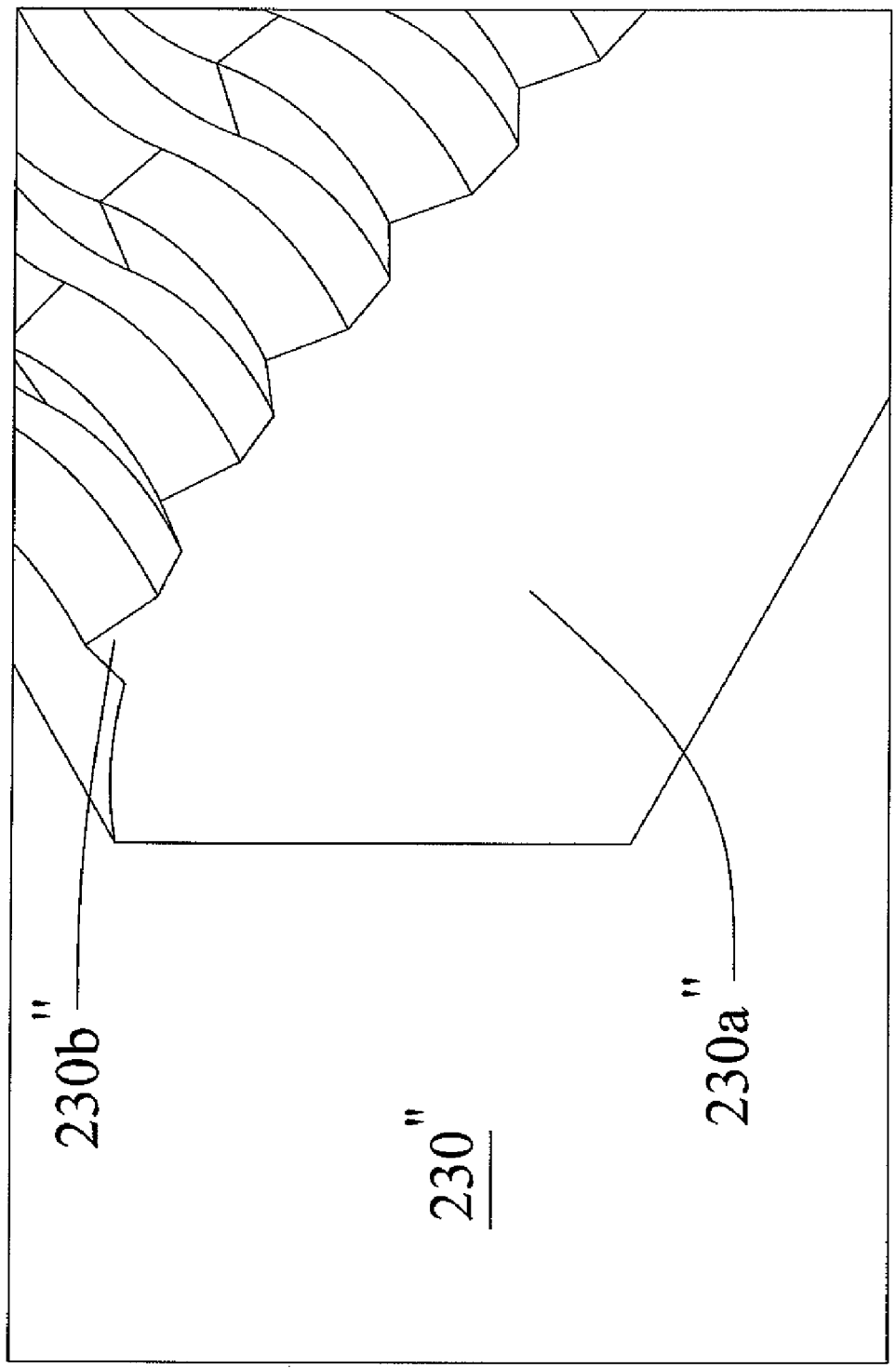
FIG. 8 is a fragmentary perspective view of yet another embodiment of the optical sheet of the invention.

In the embodiments set forth above, the microstructures are formed in triangular struts and have a cross section of an isosceles right triangle. To those skilled in the art, the shape of the microstructures may be changed, such as making the vertex angle other than 90°. Also, the microstructures may also be formed in a shape other than the triangular struts. FIG. 7 illustrates another embodiment of the optical sheet 230' on which the microstructures 230b' are formed in a tortuous fashion on the top surface of the substrate 230a'. FIG. 8 depicts yet another embodiment of the optical sheet 230" on which the microstructures 230b" are disposed in a tortuous fashion on a curved top surface of the substrate 230a".

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

We claim:

1. An optical sheet comprising:
a substrate; and
a plurality of microstructures which are disposed on the substrate and spaced from one another at a distance d, and have respectively a cross section formed in a triangle which has a base length D, wherein the distance d and the base length D are formed to satisfy an equation as follows: 0.06<d/(d+D)<0.38, wherein the substrate includes a top surface, wherein the plurality of microstructures is disposed on the top surface of the substrate, with the base length D being on the top surface, wherein the plurality of microstructures includes a spacing along the top surface from one another and defining the distance d, with each spacing arranged in a tortuous fashion on the top surface.

2. The optical sheet of claim 1, wherein the cross section of each of the plurality of microstructure is an isosceles right triangle.

3. The optical sheet of claim 2, wherein the plurality of microstructures is formed in triangular struts.

4. The optical sheet of claim 2, wherein the distance d and the base length D are formed to satisfy an equation as follows: $0.08<d/(d+D)\leqq0.27$.

5. The optical sheet of claim 2, wherein the distance d and the base length D are formed to satisfy an equation as follows: $d/(d+D)=0.13$.

6. The optical sheet of claim 2, wherein the distance d and the base length D are formed to satisfy an equation as follows: $d/(d+D)=0.1$.

7. The optical sheet of claim 2, wherein the optical sheet is formed at a thickness between 0.5 mm and 2 mm.

8. The optical sheet of claim 2, wherein the optical sheet is formed at a thickness between 0.062 mm and 0.375 mm.

9. The optical sheet of claim 2, wherein the optical sheet is made from a material selected from the group consisting of polymethylmethacrylate, polycarbonate, polystyrene, methyl methacrylate-styrene monomers copolymer, and families consisting of polyvinyl, polypropylene and polyethylene terephthalate.

10. The optical sheet of claim 1, wherein the substrate includes a top surface and a thickness, wherein the plurality of microstructures is disposed on the top surface, wherein the base length D is on the top surface, wherein the top surface of the substrate is a curved surface and the thickness of the substrate varies.

11. An optical sheet comprising:
a substrate having a top surface; and
a plurality of microstructures disposed on the top surface of the substrate at a distance d on the top surface, with each of the plurality of microstructures having a cross section formed in a triangle which as a base length D, wherein the distance d and the base length D are formed to satisfy an equation as follows: $0<d(d+D)<0.61$, wherein the top surface of the substrate is a curved surface and the thickness of the substrate varies,
wherein the base length D is on the top surface, wherein the plurality of microstructures includes a spacing along the top surface from one another and defining the distance d, with each spacing arranged in a tortuous fashion on the top surface.

12. The optical sheet of claim 11, wherein the distance d and the base length D are formed to satisfy an equation as follows: $0.03<d/(d+D)\leqq0.52$.

13. The optical sheet of claim 11, wherein the distance d and the base length D are formed to satisfy an equation as follows: $0.06<d/(d+D)\leqq0.38$.

14. The optical sheet of claim 11, wherein the distance d and the base length D are formed to satisfy an equation as follows: $0.08<d/(d+D)\leqq0.27$.

15. The optical sheet of claim 11, wherein the distance d and the base length D are formed to satisfy an equation as follows: $d/(d+D)=0.13$.

16. The optical sheet of claim 11, wherein the distance d and the base length D are formed to satisfy an equation as follows: $d/(d+D)=0.1$.

* * * * *